United States Patent [19]

Matsuoka

[11] Patent Number: 6,009,492
[45] Date of Patent: *Dec. 28, 1999

[54] EXPANSION DEVICE AND COMPUTER SYSTEM TO WHICH EXPANSION DEVICE CAN BE CONNECTED

[75] Inventor: Yoshio Matsuoka, Tokyo, Japan

[73] Assignee: Kabushiki Kaisha Toshiba, Kanagawa-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/716,899

[22] Filed: Sep. 20, 1996

[30] Foreign Application Priority Data

Feb. 29, 1996 [JP] Japan ................................. 8-043658

[51] Int. Cl.$^6$ ................................. G06F 13/00
[52] U.S. Cl. .................. 710/129; 710/131; 710/102; 710/16; 710/36
[58] Field of Search .................. 395/281, 282, 395/283, 309, 822, 836, 856, 858, 882, 883, 891, 892, 893, 500, 527; 439/74, 61; 361/686, 413

[56] References Cited

U.S. PATENT DOCUMENTS

| | | | |
|---|---|---|---|
| 5,090,830 | 2/1992 | Kroeger et al. | 400/719 |
| 5,237,663 | 8/1993 | Srinivasan | 395/309 |
| 5,287,460 | 2/1994 | Olsen et al. | 395/821 |
| 5,331,509 | 7/1994 | Kikinis | 361/686 |
| 5,428,730 | 6/1995 | Baker et al. | 395/154 |
| 5,497,490 | 3/1996 | Harada et al. | 395/700 |
| 5,545,057 | 8/1996 | Tan et al. | 439/540 |
| 5,548,782 | 8/1996 | Michael et al. | 395/835 |
| 5,553,245 | 9/1996 | Su et al. | 395/284 |
| 5,564,055 | 10/1996 | Asnaashari et al. | 395/829 |
| 5,604,870 | 2/1997 | Moss et al. | 395/281 |
| 5,615,344 | 3/1997 | Corder | 395/309 |
| 5,659,800 | 8/1997 | Zhang et al. | 395/882 |
| 5,664,118 | 9/1997 | Nishigaki et al. | 395/283 |
| 5,687,387 | 11/1997 | Endejan et al. | 395/822 |
| 5,734,840 | 3/1998 | Chew et al. | 395/281 |
| 5,805,833 | 9/1998 | Verdum | 395/281 |

*Primary Examiner*—Ayaz R. Sheikh
*Assistant Examiner*—Raymond N Phan
*Attorney, Agent, or Firm*—Limbach & Limbach L.L.P.

[57] ABSTRACT

A PC card adapter and an I/O adapter as expansion devices respectively have discrimination circuits for outputting discrimination signals. A computer body has an expansion connector commonly used for the PC card adapter and the I/O card adapter, and an I/O controller. A selected one of the PC card adapter and the I/O adapter is connected to the expansion connector. The I/O controller has an input/output section commonly used for the PC card adapter and the I/O adapter and corresponding to the expansion connector, and a bus switching circuit for switching bus signal lines for input/output processing of interface signals input/output through the input/output section. With this arrangement, in a computer system using a plurality of types of expansion devices such as a PC card slot, a printer port, and a serial communication port, the number of input/output pins and the number of connectors of each controller for interfacing between a corresponding expansion device and the computer body can be decreased, thereby realizing reductions in the size and cost of the system.

2 Claims, 8 Drawing Sheets

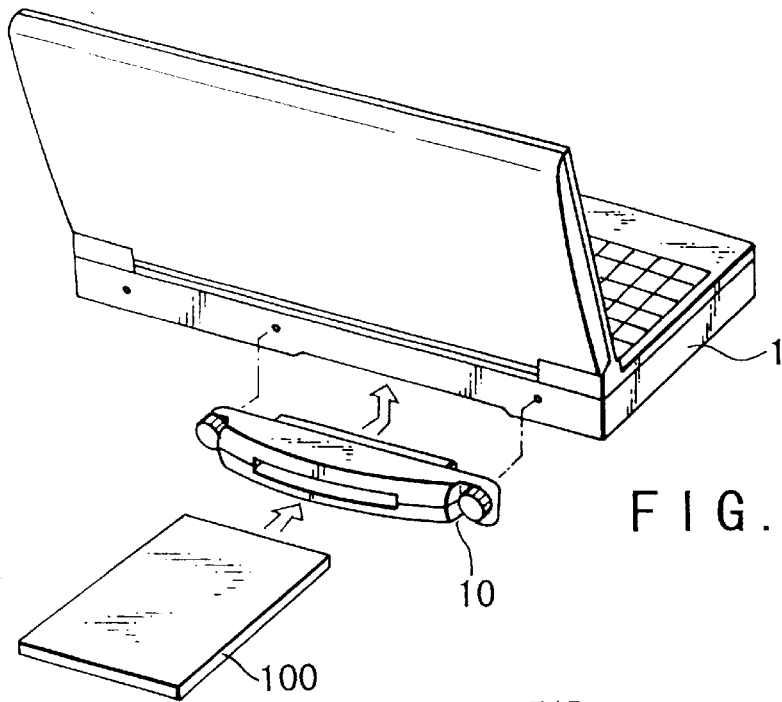
FIG. 5
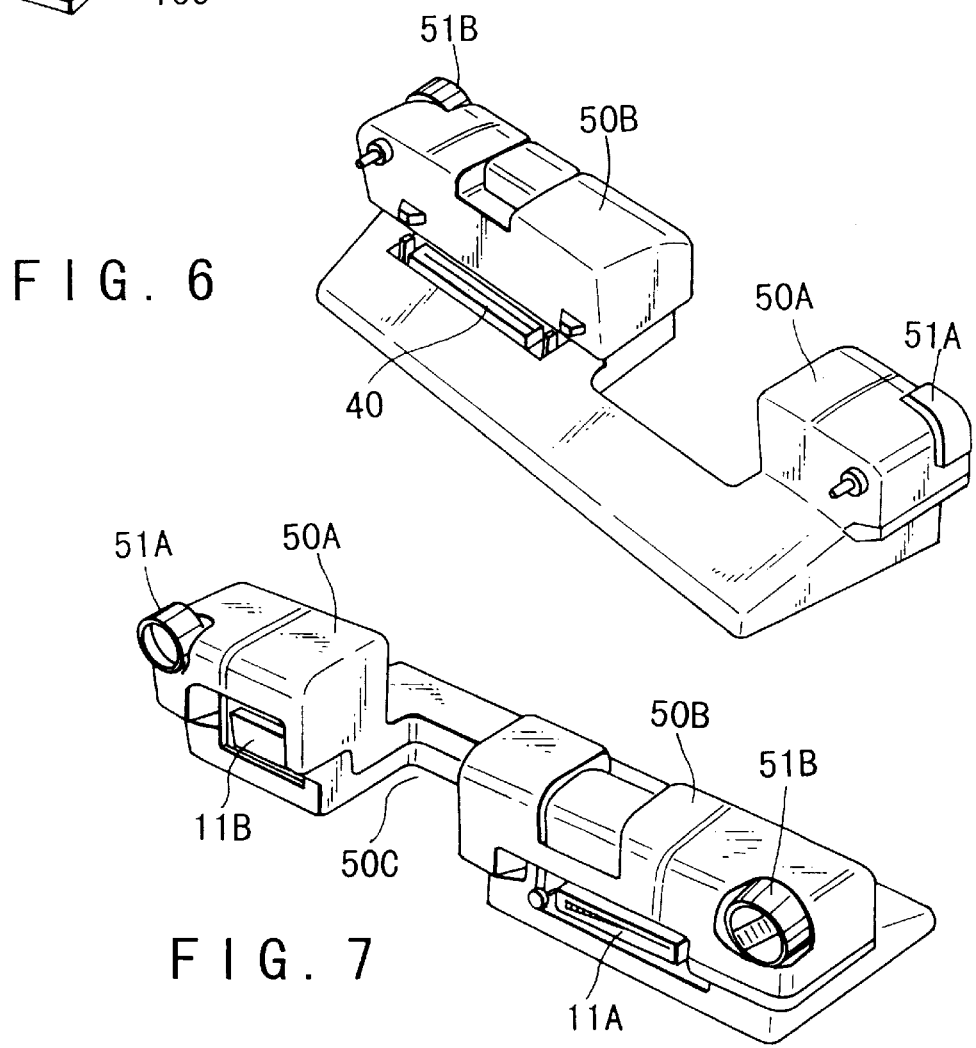
FIG. 6
FIG. 7

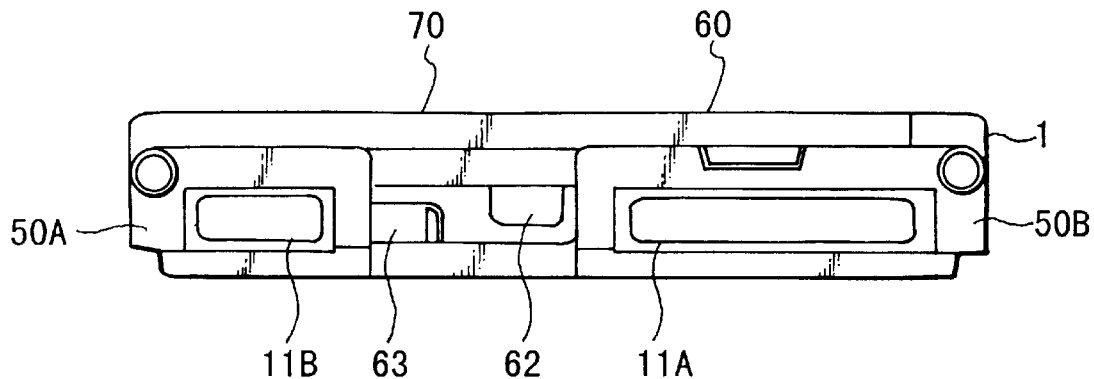
F I G. 1 0
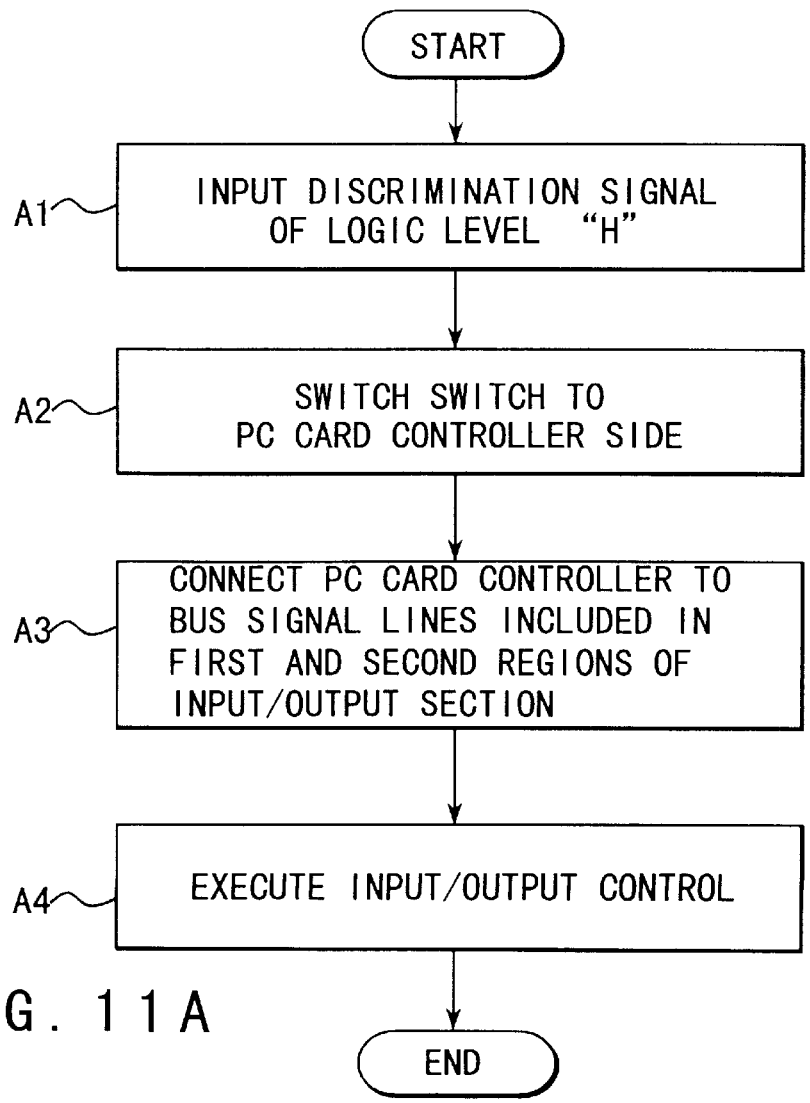
F I G. 1 1 A

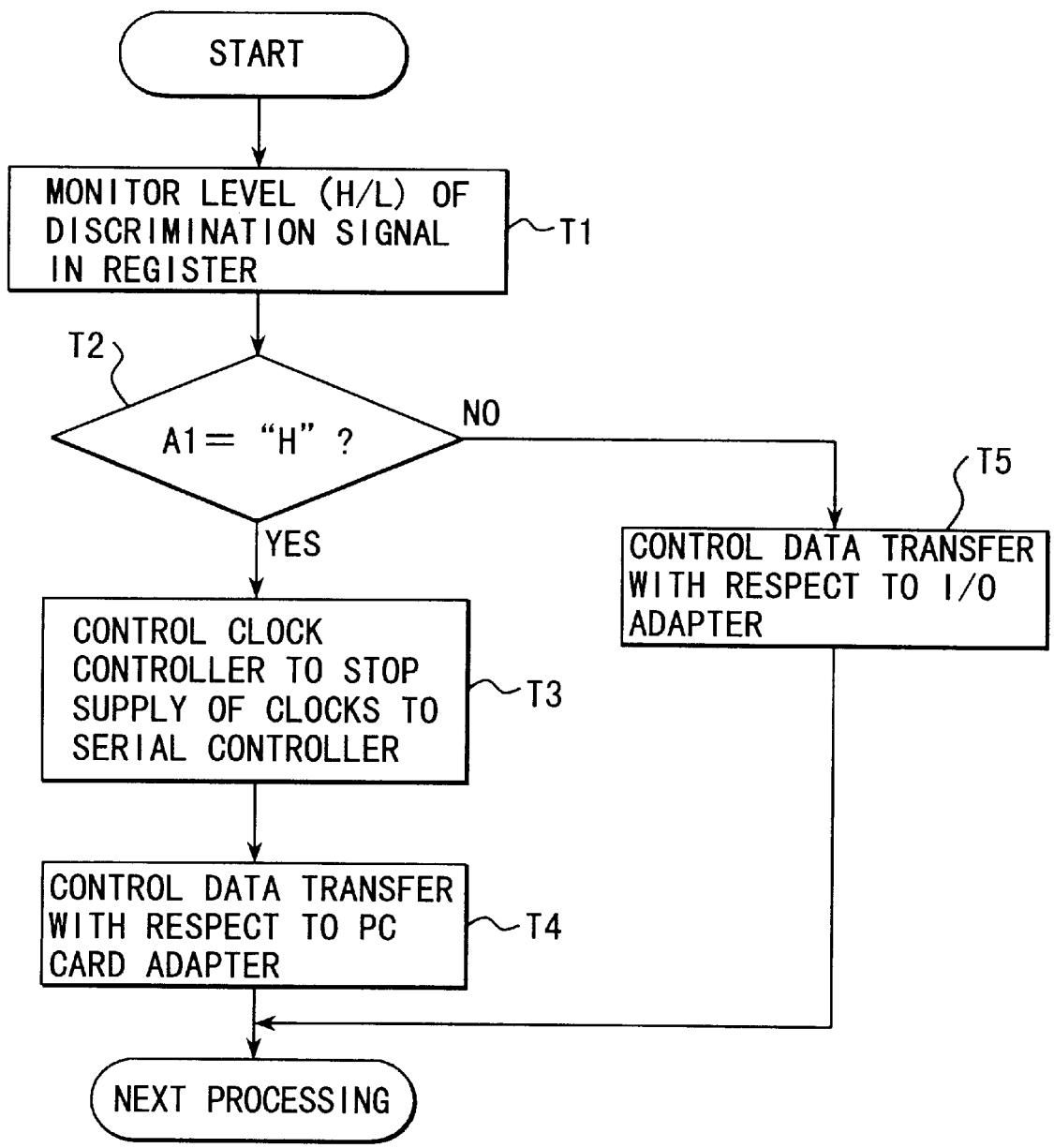
F I G. 1 2

EXPANSION DEVICE AND COMPUTER SYSTEM TO WHICH EXPANSION DEVICE CAN BE CONNECTED

BACKGROUND OF THE INVENTION

1. Field of the Invention

The present invention relates to expansion device such as a PC card slot, and a computer system to which the expansion device can be connected.

2. Description of the Related Art

Conventional expansion devices for a personal computer include a PC card slot, a printer port, a serial communication port, and the like. Note that the PC card slot is an expansion slot for PC cards, which is based on the standards of PCMCIA (Personal Computer Memory Card International Association). In using expansion devices, each device is detachably connected to a computer body through a dedicated connector. The computer body has a plurality of types of body-side connectors corresponding to the dedicated connectors for various expansion devices.

The computer body includes an I/O controller (mainly constituted by a gate array) for controlling input/output processing of interface signals between the above expansion devices and the CPU in the computer. The I/O controller is connected to the PC card slot, the printer port, and the serial communication port through the respective connectors mounted in the computer body.

In a personal computer which can use expansion devices, since input/output control of interface signals is performed by the I/O controller in the computer body as described above, the I/O controller respectively assigns interface signals through the individual connectors arranged for the respective expansion devices.

For example, a dedicated connector having 68 pins is provided for the PC card slot, and the I/O controller has 68 input/output pins for interface signals. Similarly, 25 input/output pins for interface signals are arranged for the printer port, and 9 input/output pins for interface signals are arranged for the serial communication port.

As the number of types of expansion devices increases, therefore, the number of input/output pins of the I/O controller increases, resulting in increases in the size and cost of an IC package constituting a gate array. In addition, the computer body has connectors corresponding to the dedicated connectors of the respective expansion devices. For this reason, with an increase in the number of connectors, the space required to mount the connectors increases. Since the space required to mount connectors is limited especially in a compact personal computer such as a notebook computer, it is difficult to use a plurality of types of expansion devices.

SUMMARY OF THE INVENTION

It is, therefore, an object of the present invention to provide a computer system which can realize reductions in size and cost by decreasing the numbers of input/output pins and the numbers of connectors of controllers for interfacing between various expansion devices and a computer body.

According to the first aspect of the present invention, there is provided a computer system comprising a computer; various expansion devices for expanding functions of the computer; and a single expansion connector mounted on the computer to electrically connect one of the various expansion devices to the computer system, the computer comprising various controllers for respectively performing input/output control between the computer system and the various expansion devices, bus signal lines for respectively connecting the various controllers to the expansion connector, discrimination means for discriminating a type of expansion device connected to the expansion connector, and bus switching means for switching the bus signal lines to connect the connected expansion device to the corresponding controller in accordance with a discrimination result obtained by the discrimination means.

Each of the various expansion devices may comprise a circuit for generating an identification signal indicating a type of device. The identification signal generated by the circuit may be represented by a logic level. The discrimination means may comprise means for discriminating a type of expansion device connected to the expansion connector on the basis of a logic level of an identification signal generated by the circuit. At least one of the various controllers may be a PC card controller. At least one of the various controllers may be a printer controller. At least one of the various controllers may be a serial communication controller.

The computer may comprise means for supplying an operation clock to the serial communication controller. The computer may comprise clock stop means for stopping supply of an operation clock to the serial communication controller while the serial communication controller is not used.

Each of the various expansion devices may comprise a dedicated connector to be directly connected to the expansion connector. The number of pins of the expansion connector is equal to or less than a summing number of pins of the various expansion devices.

At least one of the various expansion devices may be a PC card adapter. At least one of the various expansion devices may be an I/O adapter. The I/O adapter may comprise a printer adapter. The I/O adapter may comprise a serial transfer adapter. The I/O adapter may comprise both a printer adapter and a serial transfer adapter. The printer adapter and the serial transfer adapter respectively may comprise a printer connector and a serial transfer connector.

The computer may comprise a communication signal generating section mounted on a rear surface portion of the computer. In this case, the communication signal generating section may comprise means for emitting infrared rays. The I/O adapter may have an opening portion formed so as not to interfere with propagation of a signal generated by the communication signal generating section.

The computer may comprise a PC card ejector mounted on a rear surface portion of the computer. In this case, the I/O adapter may have an opening portion formed so as not to interfere with operation of the PC card ejector. The printer connector and the serial transfer connector may be arranged on both sides of the opening portion so as not to interfere with functions of the communication signal generating section and the PC card ejector.

The computer may comprise a CRT connector mounted on a rear surface portion of the computer. In this case, the I/O adapter may have an opening portion formed so as not to interfere with use of the CRT connector.

According to still another aspect of the present invention, there is provided an expansion device having a communication signal generating section and adapted to expand functions of a computer, comprising a dedicated connector to be detachably connected to the computer; and two types of connectors to be connected to other devices, wherein the expansion device has an opening portion formed so as not to interfere with propagation of a signal generated by the communication signal generating section.

The expansion device may be an I/O adapter. One of the two types of connectors may be a printer connector. One of the two types of connectors may be a serial transfer connector. The two types of connectors may be a printer connector and a serial transfer connector.

According to still another aspect of the present invention, there is provided an expansion device having a communication signal generating section and a PC card ejector and adapted to expand functions of a computer, comprising a dedicated connector to be detachably connected to the computer; and two types of connectors to be connected to other devices, wherein the expansion device has an opening portion formed so as not to interfere with propagation of a signal generated by the communication signal generating section and an operation of the PC card ejector.

The two types of connectors may be arranged on both sides of the opening portion.

According to still another aspect of the present invention, there is provided an expansion device having a communication signal generating section, a PC card ejector, and a CRT connector, and adapted to expand functions of a computer, comprising a dedicated connector to be detachably connected to the computer; and two types of connectors to be connected to other devices, wherein the expansion device has an opening portion formed so as not to interfere with propagation of a signal generated by the communication signal generating section, an operation of the PC card ejector, and connection of the CRT connector.

The two types of connectors may be arranged on both sides of the opening portion.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiment of the present invention and, together with the general description given above and the detailed description of the preferred embodiment given below, serve to explain the principles of the present invention in which:

FIG. 5 is a perspective view showing how the PC card adapter in FIGS. 3A to 3G is mounted on the personal computer;

FIG. 6 is a first perspective view showing the outer appearance of an I/O adapter in FIG. 1;

FIG. 7 is a second perspective view showing the outer appearance of the I/O adapter in FIG. 1;

FIG. 10 is a rear view showing the outer appearance of the personal computer on which the I/O adapter in FIGS. 6 and 7 is mounted.;

FIGS. 11A and 11B are flow charts for explaining the operation of the computer system according to the above embodiment; and FIG. 12 is a flow chart for explaining the operation of an additional function of the computer system according to the above embodiment.

DETAILED DESCRIPTION OF THE PREFERRED EMBODIMENTS

An embodiment of the present invention will be described below with reference to the accompanying drawings.
System Configuration of Computer For example, a computer system of this embodiment is a portable personal computer which has an interface device for the use of a plurality of types of expansion devices.

Figure 1:
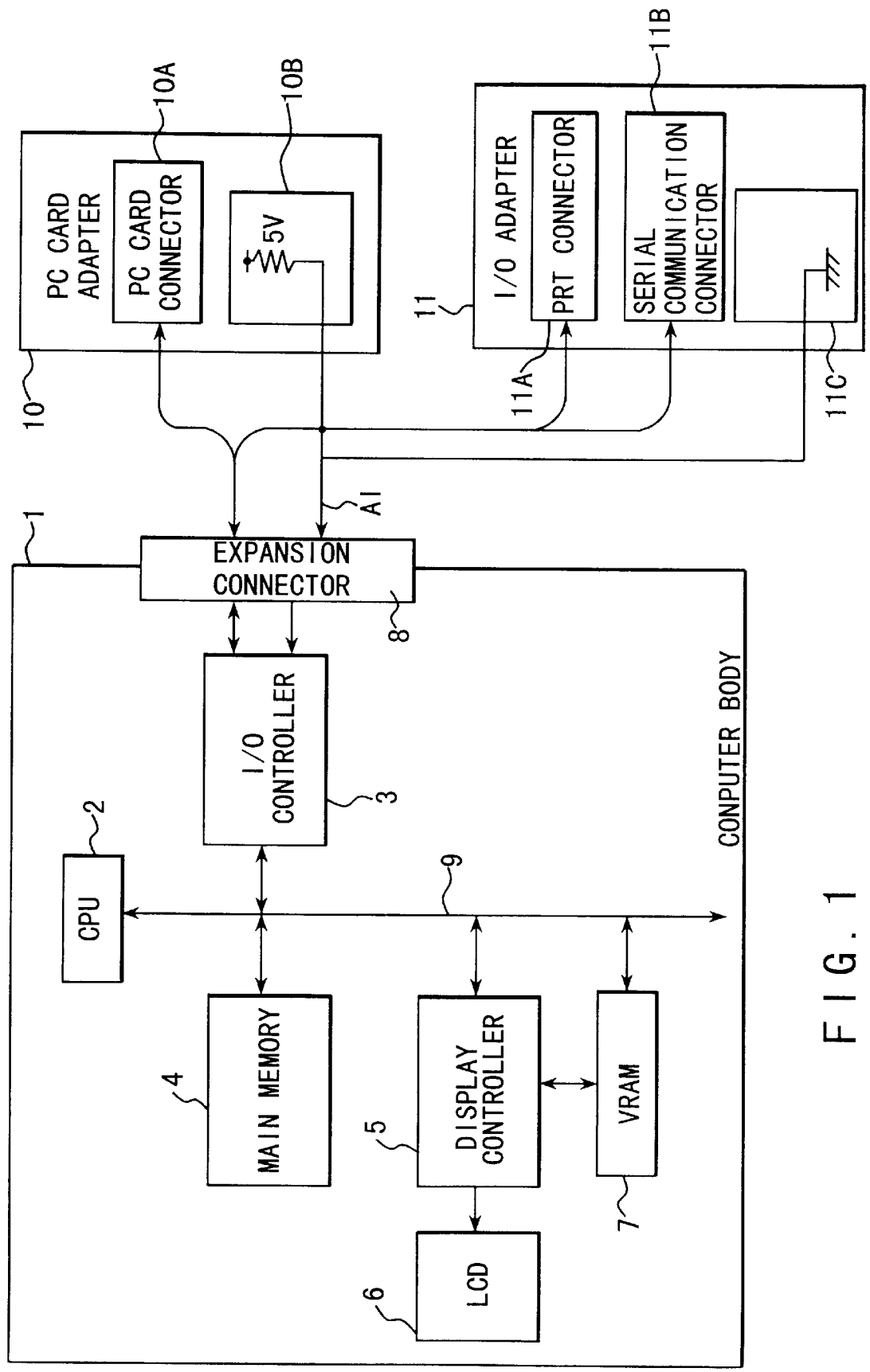
FIG. 1 is a block diagram showing the main part of a computer system according to an embodiment of the present invention.
Figure 2:
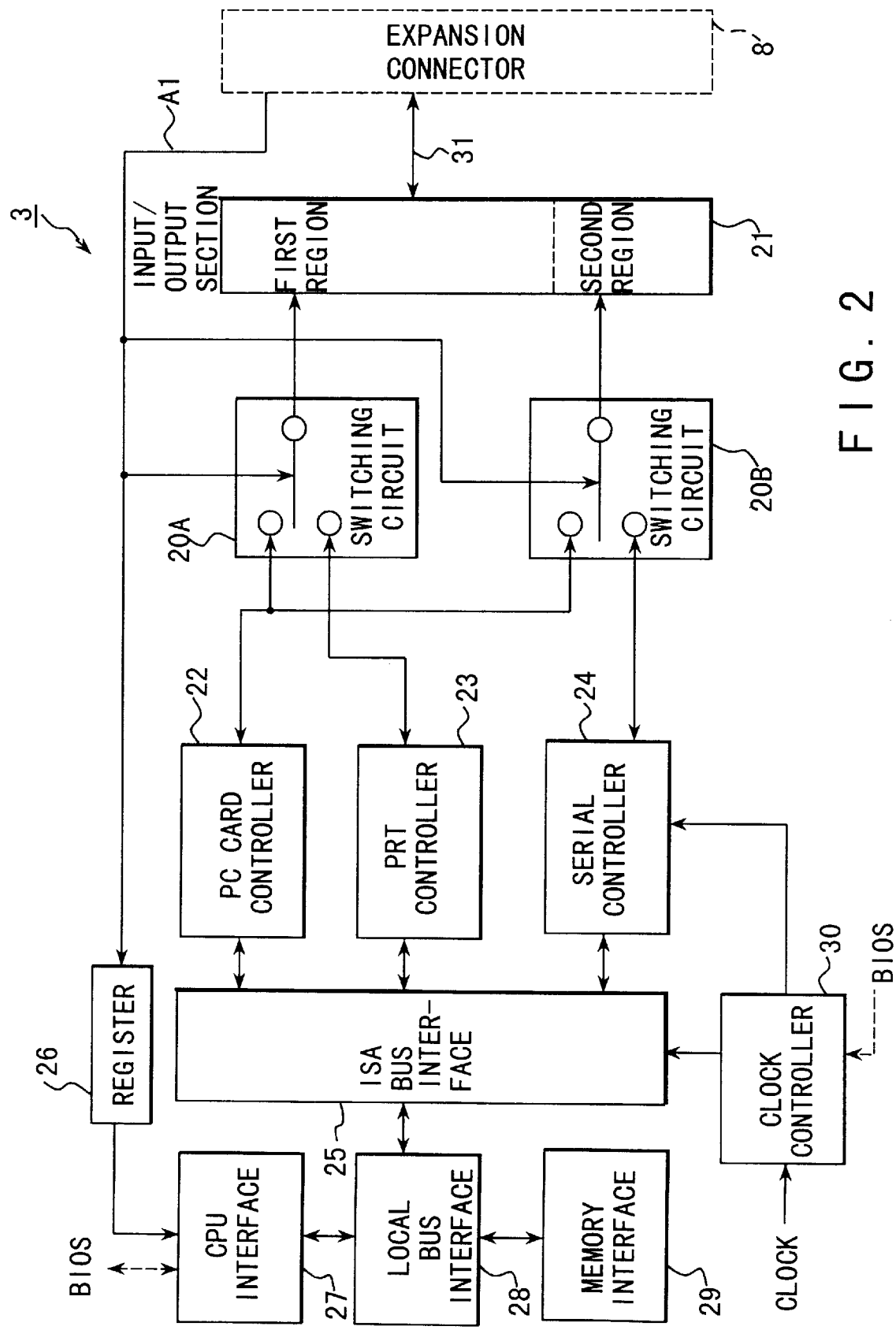
FIG. 2 is a block diagram showing the arrangement of an I/O controller in FIG. 1.

FIG. 1 is a block diagram showing the main part of a computer system according to an embodiment of the present invention. FIG. 2 is a block diagram showing the arrangement of an I/O controller in FIG. 1.

As shown in FIG. 1, a system body (computer body) 1 includes a CPU 2, an I/O controller 3, a main memory 4, a display controller 5, a liquid crystal display (LCD) 6, a video RAM (VRAM) 7, and an expansion connector 8. The I/O controller 3 and the expansion connector 8 are constituent elements of an interface device according to this embodiment.

The expansion connector 8 is a body-side connector for directly connecting an expansion device to a dedicated connector to connect the expansion device to the I/O controller 3 of the system body 1. Assume that two types of expansion devices, i.e., a PC card adapter (slot) 10 and an I/O adapter (port) 11, are used in this embodiment. In this case, the dedicated connectors are a PC card connector 10A, a PRT connector 11A, and a serial communication connector 11B.

The PC card adapter 10 has the dedicated PC card connector 10A to be connected to the connector portion of a PC card, and a discrimination circuit 10B for outputting a discrimination signal AI (logic level "H").

The I/O adapter 11 corresponds to an integral structure constituted by a printer port and a serial communication port (e.g., RS232C scheme), and includes the PRT connector 11A and the serial communication connector 11B as dedicated connectors. The I/O adapter 11 also includes a discrimination circuit 11C for outputting a discrimination signal AI (logic level "L").

Figure 3A:
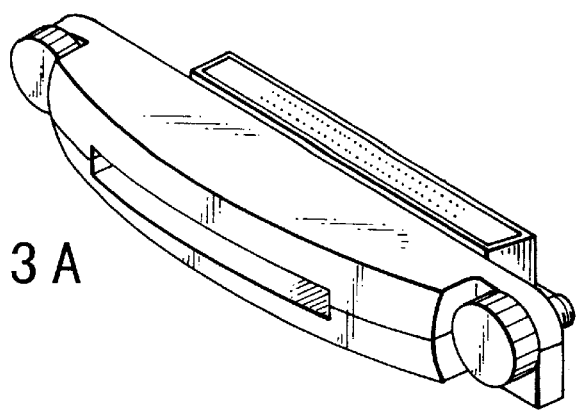
FIGS. 3A to 3G are views showing the outer appearance of a PC card adapter in FIG. 1.
Figure 3B:
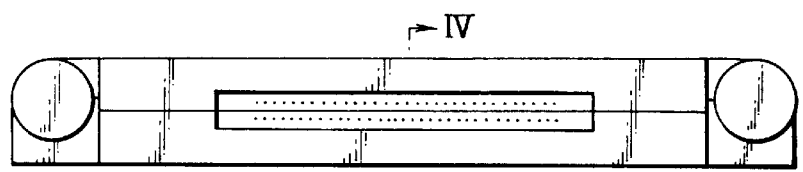
Figure 3C:
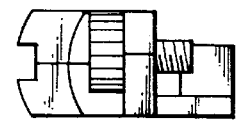
Figure 3D:
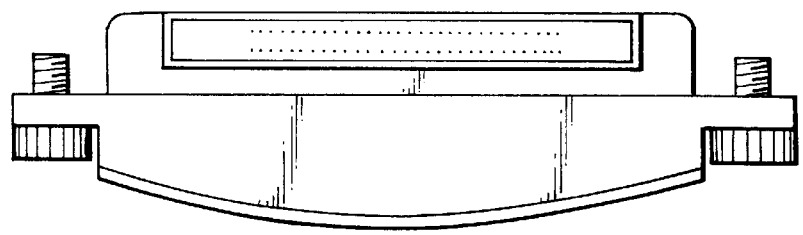
Figure 3E:
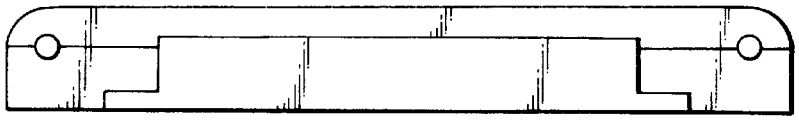
Figure 3F:
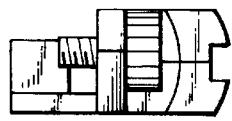
Figure 3G:
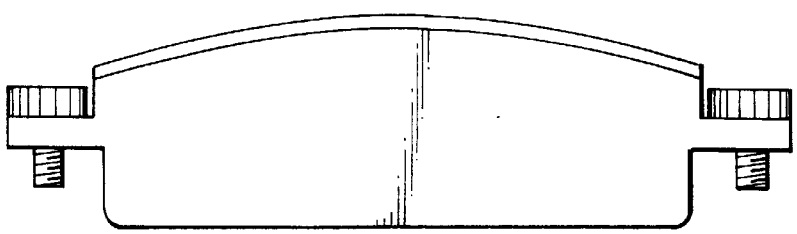

The expansion connector 8 is connected to either the PC card adapter 10 or the I/O adapter 11 but cannot be connected to them at once. That is, the expansion connector 8 connects the PC card bus of the PC card adapter 10 or the printer parallel and serial buses (RS232C scheme) of the I/O adapter 11 to a common bus 9 on the body side.
Arrangement of PC Card Adapter FIG. 3A shows the outer appearance of the PC card adapter 10. FIG. 3B is a front view of the PC card adapter 10. FIG. 3C is a right side view of the adapter 10. FIG. 3D is a plan view of the adapter 10. FIG. 3E is a rear view of the adapter 10. FIG. 3F is a left side view of the adapter 10. FIG. 3G is a bottom view of the adapter 10.

Figure 4:
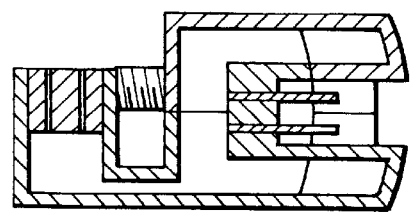
FIG. 4 is a sectional view taken along a line IV—IV of the PC card adapter in FIG. 3B.

FIG. 4 is a sectional view taken along a line IV—IV of the PC card adapter 10 in FIG. 3B. FIG. 5 is a perspective view showing how the PC card adapter 10 is connected to the expansion connector 8 of the computer body 1. Another PC card 100 can be used, together with a PC card slot 61 mounted on the computer body 1 side, through the PC card adapter 10.

Structure of I/O adapter

FIGS. 6 to 10 show the structure of the I/O adapter 11. The I/O adapter 11 is a port replicator used as an expansion device for the computer.

FIG. 6 is a perspective view showing the outer appearance of the I/O adapter 11 viewed from the computer body side. As described above, the I/O adapter 11 has a dedicated connector 40 to be connected to the expansion connector 8 mounted on the bottom portion of the computer body. In addition, as shown in FIG. 7, the I/O adapter 11 has a member 50A on which the serial communication connector 11B is mounted, and a member 50B on which the PRT connector 11A is mounted. Fixing screws 51A and 51B for mounting the I/O adapter 11 on the computer body 1 are arranged on the two end portions of the I/O adapter 11.

The structure of the I/O adapter 11 is characterized by an opening portion 50C formed between the members 50A and 50B. With the opening portion 50C, for example, an infrared communication generating unit 62 and an ejector 63 for the PC card slot, which are arranged on the rear surface of the computer body 1, can be used while the I/O adapter 11 is connected to the computer body 1.

Assume that a body-side connector (not shown) for connection of a CRT display or the like is mounted on the rear surface of the computer body 1. In this case, the opening portion 50C allows the CRT display to be connected to the body-side connector without interfering therewith.

Figure 8:
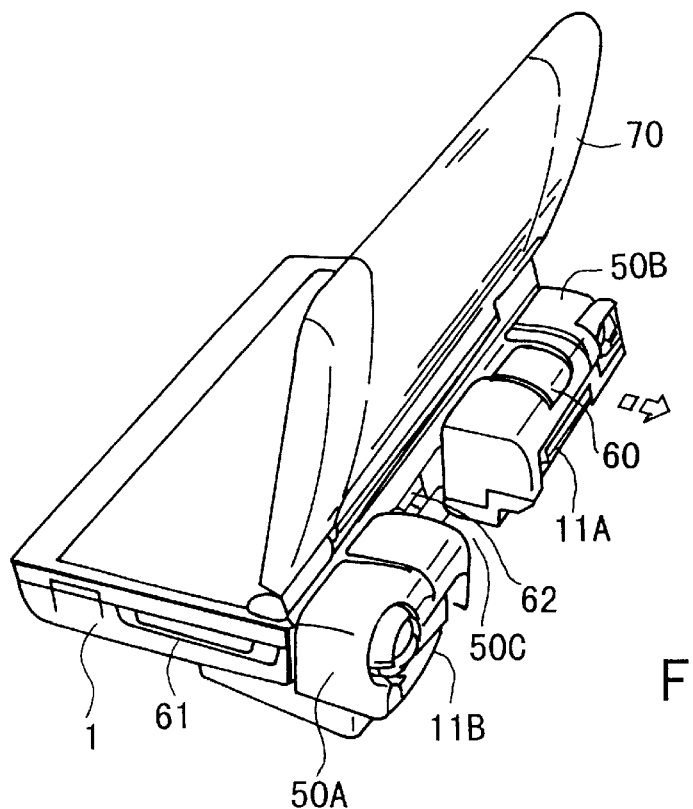
FIG. 8 is a first perspective view showing the outer appearance of the personal computer on which the I/O adapter in FIGS. 6 and 7 is mounted.

FIG. 8 is a perspective view showing a notebook personal computer having the I/O adapter 11 connected to the computer body 1. FIG. 10 is a rear view of this structure.

Figure 9:
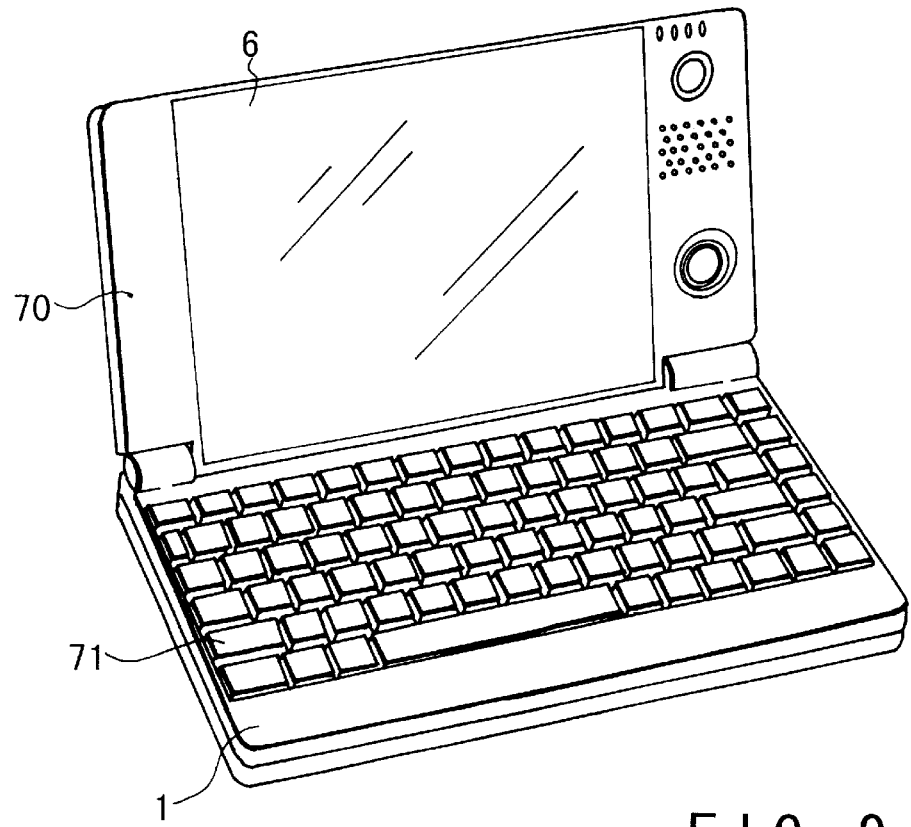
FIG. 9 is a second perspective view showing the outer appearance of the personal computer on which the I/O adapter in FIGS. 6 and 7 is mounted.

As shown in FIG. 9, the above personal computer is constituted by a display unit 70 having the LCD 6 and a keyboard 71 which are integrally formed. When the I/O adapter 11 is to be mounted on this computer, the dedicated connector 40 of the I/O adapter 11 is positioned to oppose the expansion connector 8 (not shown) mounted on the bottom surface of the computer body 1 and is connected thereto. As shown in FIG. 8, the I/O adapter 11 has a lever 60 which is used to remove the I/O adapter 11 from the computer body 1.

Arrangement of I/O Controller

As shown in FIG. 2, the I/O controller 3 includes a PC card controller 22, a PRT (printer) controller 23, and a serial controller 24 which correspond to expansion processing by means of the PC card adapter 10 and the I/O adapter 11.

The PC card controller 22 performs input/output control of interface signals between the PC card adapter 10 connected to the expansion connector 8 and the system body 1. Similarly, the PRT controller 23 performs input/output control of interface signals between the PRT connector 11A of the I/O adapter 11 connected to the expansion connector 8 and the system body 1. The serial controller 24 performs input/output control of interface signals between the serial communication connector 11B of the I/O adapter 11 connected to the expansion connector 8 and the system body 1.

The controllers 22 to 24 are connected to a local bus interface 28 through an ISA (Industrial Standard Architecture) bus interface 25. A CPU interface 27 and a memory interface 29, which are connected to the CPU 2, are connected to the local bus interface 28.

The controllers 22 to 24 are connected to bus signal lines set by bus switching circuits 20A and 20B, and connected to the expansion connector 8 through an input/output section 21 as a relay section for each bus signal line. As will be described later, the bus switching circuits 20A and 20B switch the bus signal lines in accordance with a discrimination signal AI input through the expansion connector 8. The input/output section 21 and the expansion connector 8 are connected to each other through an expansion bus 31.

In this case, each of the input/output section 21 and the expansion connector 8 is commonly used for the PC card adapter 10 and the I/O adapter 11 and has input/output pins equal to or more in number than the pins of the dedicated connector having the maximum number of pins. More specifically, the PC card connector 10A has 68 pins, the PRT connector 11A has 25 pins, an the serial communication connector 11B has 9 pins. Therefore, it suffices to have at least input/output pins equal in number to the 68 pins of the PC card connector 10A.

The input/output section 21 is divided into two input/output regions (first and second regions). The bus signal lines for the PRT connector 11A are connected to the first region, whereas the bus signal lines for the serial communication connector 11B are connected to the second region. The bus signal lines for the PC card connector 10A are connected to both the first and second regions.

The I/O controller 3 has a clock controller 30 for supplying clocks for serial communication. The clock controller 30 is controlled by a BIOS (Basic Input/Output System).

Operation of System

The operation of this system, which is mainly associated with the I/O controller 3, will be described next with reference to the flow charts of FIGS. 11A and 11B. Connection of the PC card adapter to the computer body and connection of the I/O adapter to the computer body will be separately described below.

Assume that the PC card adapter 10 is selected by the user and connected to the expansion connector 8 of the computer body 1 (see FIG. 11A). A PC card having a predetermined function is connected to the PC card connector 10A of the PC card adapter 10.

When the I/O controller 3 receives a discrimination signal (logic level "H") AI from the PC card adapter 10 through the expansion connector 8 (step A1), the bus switching circuits 20A and 20B switch the switches to the PC card controller 22 side (step A2). With this operation, the PC card controller 22 is connected to the bus signal lines included in the first and second regions of the input/output section 21 through the bus switching circuits 20A and 20B (step A3).

The PC card controller 22 executes input/output control of interface signals through the PC card adapter 10 connected to the expansion connector 8 and the bus signal lines set by the bus switching circuits 20A and 20B (step A4).

Figure 11B:
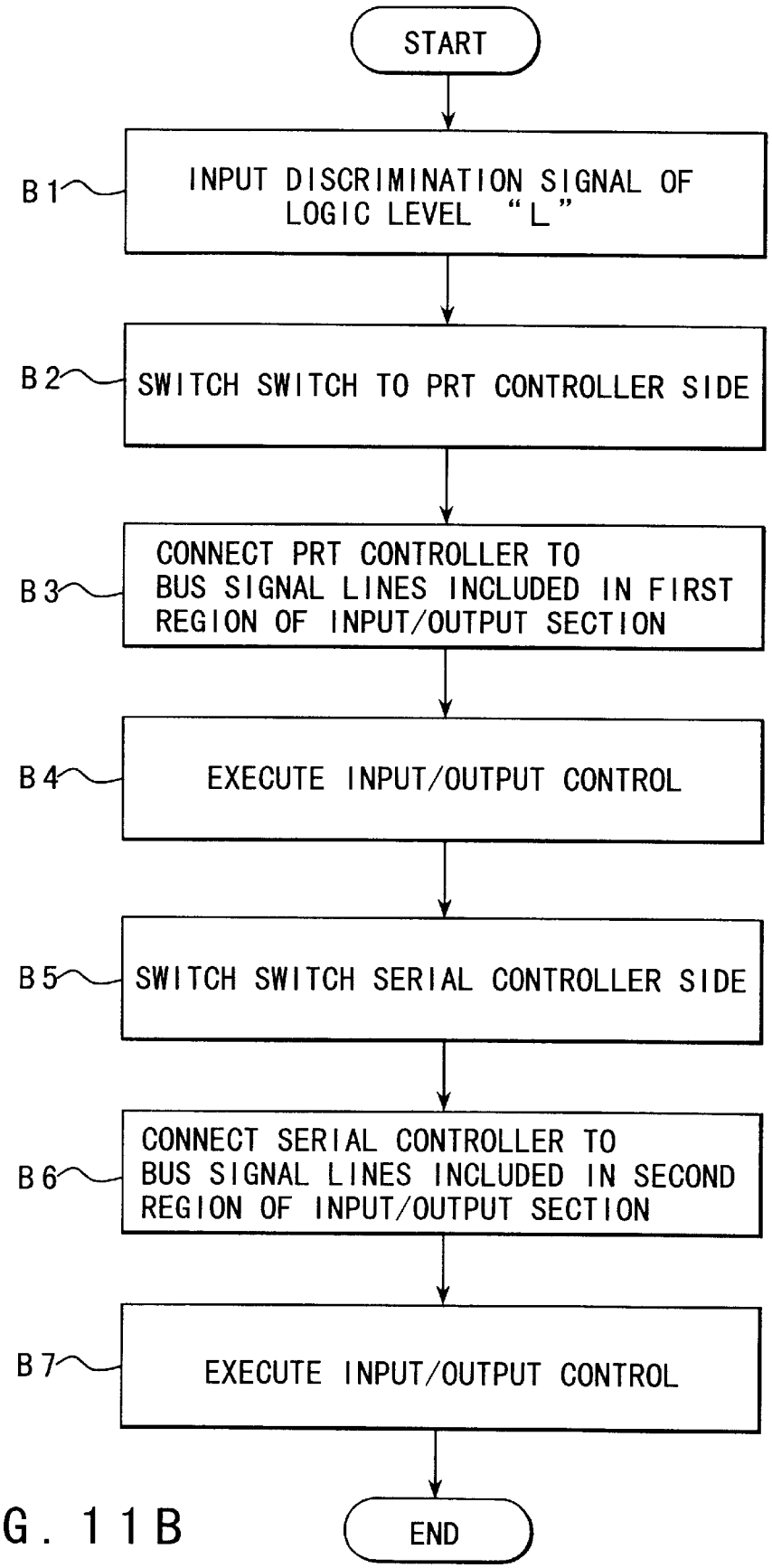

Assume that the I/O adapter 11 is selected and connected to the expansion connector 8 of the computer body 1 (see FIG. 11B).

In this case, as described above, both the I/O adapter 11 and the PC card adapter 10 cannot be connected at once. In this embodiment, the PRT connector 11A and the serial communication connector 11B are provided for the I/O adapter 11.

When the I/O controller 3 receives a discrimination signal (logic level "L") AI from the I/O adapter 11 through the expansion connector 8 (step B1), the bus switching circuit 20A switches the switch to the PRT controller 23 side (step B2). With this operation, the PRT controller 23 is connected to the bus signal lines included in the first region of the input/output section 21 through the bus switching circuit 20A (step B3).

The PRT controller 23 executes input/output control of interface signals through the PRT connector 11A of the I/O adapter 11 connected to the expansion connector 8 and the bus signal lines set by the bus switching circuit 20A (step B4).

Meanwhile, the bus switching circuit 20B switches the switch to the serial controller 24 side (step B5). With this operation, the serial controller 24 is connected to the bus signal lines included in the second region of the input/output section 21 through the bus switching circuit 20B (step B6).

The serial controller 24 executes input/output control of interface signals through the serial communication connector 11B of the I/O adapter 11 connected to the expansion connector 8 and the bus signal lines set by the bus switching circuit 20B (step B7).

When the I/O adapter 11 is connected to the expansion connector 8, and only one of the PRT connector 11A and the serial communication connector 11B is effective, the corresponding controller 23 or 24 executes input/output control.

As described above, according to this embodiment, by connecting a selected one of the PC card adapter 10 and the I/O adapter 11 to the single expansion connector 8, input/output control of interface signals can be performed between the connected expansion device and the computer body 1.

The I/O controller 3 switches the bus signal lines for connecting the input/output section 21 connected to the expansion connector 8 to the respective controllers 22 to 24 through the bus switching circuits 20A and 20B. Therefore, similar to the expansion connector 8, the input/output section 21 is commonly used for the respective expansion devices, i.e., the PC card adapter 10 and the I/O adapter 11. In other words, the input/output section 21 need not have input/output pins equal in number to the total number of pins of the respective expansion devices, but need only have at least input/output pins equal in number to the pins of the expansion device having the maximum number of pins (68 pins in this case).

The computer system of the present invention may have the following function in addition to the functions of the system of this embodiment. The BIOS provided for the system body 1 monitors a discrimination signal AI input through the expansion connector 8, and stops supply of clocks required for the operation of an unused expansion device, thereby realizing a power management function of saving unnecessary power.

The operation of the system using this function will be described with reference to the flow chart of FIG. 12.

As shown in FIG. 2, a register 26 is arranged in the I/O controller 3. This register 26 sets the value (logic level "H" or "L") of the discrimination signal AI.

When an expansion device is connected to the expansion connector 8, the BIOS monitors the value of the discrimination signal AI through the register 26 (step T1). When the PC card adapter 10 is connected to the expansion connector 8, the BIOS controls the clock controller 30 with the discrimination signal AI of logic level "H" to stop supply of clocks to the serial controller 24 (YES in step T2; step T3). In this case, as described above, the PC card controller 22 performs input/output control (data transfer control) of interface signals with respect to the PC card adapter 10.

In other words, since the I/O adapter 11 is not connected to the expansion connector 8, the serial communication function based on the serial communication connector 11B is in an unused state. Therefore, the BIOS stops generation of clocks for serial communication, which need not be supplied to the serial controller 24. With this operation, power can be saved accordingly.

When the I/O adapter 11 is connected to the expansion connector 8, the BIOS maintains supply of clocks from the clock controller 30 to the serial controller 24 with the discrimination signal AI of logic level "L" (NO in step T24; step T5). In this case, as described above, the serial controller 24 operates in accordance with clocks from the clock controller 30 and executes input/output control of interface signals with respect to the serial communication connector 11B.

As has been described above, according to the present invention, in a computer system using a plurality of types of expansion devices such as a PC card slot, a printer port, and a serial communication port, the input/output section and the expansion connector of an interface device for interfacing between each expansion device and the system body can be commonly used for the respective expansion devices. Therefore, the number of input/output pins (bus signal lines) and the number of connectors of the input/output section can be reduced. As a result, reductions in the size and cost of the system can be realized.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A computer system to which a plurality of expansion adapters for expanding functions may be connected, comprising:

a computer; and a common expansion connector mounted on said computer to electrically connect one of said plurality of expansion adapters to said computer, said computer comprising a plurality of controllers for respectively performing input/output control between said computer and said various expansion adapters, bus signal lines for respectively connecting said plurality of controllers to said expansion connector;

discrimination means for discriminating a type of expansion adapter connected to said expansion adapter;

bus switching means for switching said bus signal lines to connect the connected expansion adapter to the corresponding controller in accordance with a discrimination result obtained by said discrimination means; and means for supplying an operation clock to a serial communication controller which is one of said plurality of controllers.

2. A system according to claim 1, wherein said computer comprises clock stop means for stopping supply of an operation clock to said serial communication controller while said serial communication controller is not used.

* * * * *